United States Patent
Ito et al.

(10) Patent No.: US 8,180,202 B2
(45) Date of Patent: May 15, 2012

(54) ROBOT, REFERENCE VOLTAGE GENERATOR CIRCUIT USED IN TRANSMISSION PATH FOR ROBOT, AND HUB INCORPORATING REFERENCE VOLTAGE GENERATOR CIRCUIT

(75) Inventors: Minobu Ito, Chiba (JP); Mitsuyoshi Abo, Chiba (JP)

(73) Assignee: Futaba Corporation (JP)

( * ) Notice: Subject to any disclaimer, the term of this patent is extended or adjusted under 35 U.S.C. 154(b) by 863 days.

(21) Appl. No.: 12/248,464

(22) Filed: Oct. 9, 2008

(65) Prior Publication Data
US 2009/0096591 A1    Apr. 16, 2009

(30) Foreign Application Priority Data

Oct. 10, 2007 (JP) ................................. 2007-263925

(51) Int. Cl.
G05F 1/10 (2006.01)
H02P 7/00 (2006.01)

(52) U.S. Cl. .............................. 388/833; 388/825; 901/2

(58) Field of Classification Search ............... 340/310.11
See application file for complete search history.

(56) References Cited

U.S. PATENT DOCUMENTS

| | | | | |
|---|---|---|---|---|
| 3,452,258 A | * | 6/1969 | Thompson | 318/604 |
| 3,522,482 A | * | 8/1970 | Thompson | 361/91.6 |
| 5,214,749 A | * | 5/1993 | Brown | 700/260 |
| 7,826,722 B2 | * | 11/2010 | Lin et al. | 388/811 |

FOREIGN PATENT DOCUMENTS

| | | |
|---|---|---|
| JP | 2000006060 A | 1/2000 |
| JP | 2006135552 A | 5/2006 |
| KP | 199520012 | 7/1995 |

* cited by examiner

*Primary Examiner* — Jennifer Mehmood
*Assistant Examiner* — John Mortell
(74) *Attorney, Agent, or Firm* — Quarles & Brady LLP

(57) ABSTRACT

A robot including a controller and multiple servos, each acting as an actuator, and a supply voltage generator circuit connected to a transmission line between the controller, which controls using the RS485 communication protocol, and the servos. The reference voltage generator circuit maintains one of a pair of differential signals (or an inversion signal) at a constant potential between a high level and a low level. As a result, a TTL communication scheme servo can be mounted and controlled, along with a RS485 scheme servo. A supply voltage generator circuit is formed of a Zener diode and a voltage divider circuit. Without being limited to incorporation at some midpoint on the transmission path, the supply voltage generator circuit can be incorporated in a controller or a hub for splitting a transmission path.

8 Claims, 11 Drawing Sheets

ROBOT, REFERENCE VOLTAGE GENERATOR CIRCUIT USED IN TRANSMISSION PATH FOR ROBOT, AND HUB INCORPORATING REFERENCE VOLTAGE GENERATOR CIRCUIT

CROSS REFERENCES TO RELATED APPLICATIONS

This application claims the priority benefit of Japanese Patent Application No. 2007-263925 filed on Oct. 10, 2007, which is fully incorporated herein by reference.

STATEMENT REGARDING FEDERALLY SPONSORED RESEARCH

Not applicable.

BACKGROUND OF THE INVENTION

The present invention relates to a robot that performs predetermined operations in a remote control mode, or based on operation commands which are sent from a personal computer (PC), or based on a program which runs automatically when predetermined conditions occur. More particularly, the present invention relates to a robot where both a RS485 communication scheme servo system, which operates with differential signals produced in response to control signals, and a transistor-transistor logic (TTL) communication scheme servo system can be used in a mixed mode.

There have been many recent developments in the field of hobby robots such as biped walking humanoid robots, with a number of hobby robot competitions being held. Like the human body, robots of this type have movable joints for wrists, elbows, shoulders, neck, waist, knees, and ankles. Servos, acting as actuators, which have rotating parts, are mounted on each joint.

FIG. 12 is a schematic diagram illustrating a humanoid robot. The robot has joint parts 1-6 and a body part 7. With reference also to FIGS. 13-16, servos 10 disposed in joints 1-6 are controlled synchronously, based on control signals from a controller 20, to execute sequential operations such as walking. The whole of the robot is formed by combining a number of frame parts 8 together. The head, body, legs, arms and the like are also formed by assembling frame parts 8 together. Each frame part 8 has cut-out sections 8a to provide space to accommodate the servos 10 while also providing weight savings and ease of assembly.

As shown in FIGS. 13(a)-14, each frame part 8 includes a reception part 8a, on the end of which a servo 10 is mounted. Each frame part 8 is journaled using a rotating disc 12 and stopper 13, which can rotate with reference to the rotational shaft 11 of the servo 10, thus forming joints 1-6. For each of the joints 1-6, one or two servos 10 are disposed in conformation with the movement of one or two of three axes, namely, pitch axis, roll axis, and yaw axis.

The body 7 includes a controller 20 and a power source, here a secondary battery contained therein. As shown in FIG. 15, the controller 20 and servos 10 are connected together using a transmission path 15 which includes signal lines, a ground line, and power lines. The controller 20 outputs control signals based on received operation commands to control the servos 10.

As shown in FIG. 16, the controller 20 comprises a control circuit 21 for producing control signals for the servos 10, a power source 22, and a power voltage converter circuit, or regulator, 23 for converting the power source voltage of the power source 22 into, for example, 5 volts, adapted for the controller circuit 21. The voltage of the power source 22 depends on the type of secondary battery. For example, plural sets of cells are combined together to use seven to twelve-volt batteries. Moreover, the control circuit 21 includes an arithmetic part 24; a memory 26, including a rewritable ROM such as an EEPROM, for storing programs corresponding to operation commands or the setting values of each servo 10, or a RAM for temporarily storing communication data; an interface 25a for receiving operation commands received by a receiver 27; and an interface 25b for interacting with the servos 10.

For receiving an operation command, the interface 25a is linked to a personal computer 29 and uses the RS232C serial communication scheme. When radio communication is performed using a dedicated controller, such as a transmitter 28, the receiver 27 is connected to the control circuit 21 via the interface 25a. The transmitter 28 transmits operation commands to the receiver 27. This system may employ, for example, the 2.4 GHz band Bluetooth® communication scheme. Bluetooth is a registered certification mark of Bluetooth SIG Inc.

The operation commands are created by coding basic actions including "rise", "walk", "crouch", "straddle", "turn head", and the like, and are transmitted to the control circuit 21 through the personal computer 29 or the transmitter 28. In contrast, the control circuit 21 programs a predetermined sequence of operations such as "walk", "rise" and the like, and then stores them in the memory 26.

In order to control the robot, the transmitter 28 or the personal computer 29 transmits operation commands to the control circuit 21. The control circuit 21 controls the rotational angle and speed of each servo 10, according to the type of operation command, thus realizing the desired movement, for example, "walking". In addition, the robot also has an automatic execution mode for executing a sequence of operations by executing a program sequentially. The controller 20 has three axis acceleration sensors (not shown) to detect the robot's own position. For example, when the robot falls down, the rising operation differs in the face-up state and in the face-down state. In such a case, when the controller receives the operation command for "rising", the controller determines its own current position so that the rising operation can be carried out according to each position.

The RS485 half-duplex communication scheme may be adopted for communication between the controller 20 and the servos 10. As for the servos 10 previously described, when attempting to emulate the motion of a human joint, one robot will require twenty or more servos 10. However, the use of the RS485 scheme allows joints to be connected to forty or more servos. Some communications between the controller 20 and the servos 10 employ the TTL scheme which uses two-valued signals comprising a high (H) level and a low (L) level. The servo 10 has sensors that measure information on the rotational angle, the current flowing through the servo, and the temperature of the servo 10.

This information is fed back to the controller 20 to reflect the control of the controller 20. For that reason, like the controller 20, each servo 10 includes transmission/receiving drivers and a power voltage converter circuit in addition to a signal processing controller. In the configuration of the above-mentioned robot, splitting the transmission line facilitates routing of conductor wiring. For that reason, hubs (not shown), each of which divides a single transmission path into plural paths, are disposed at desired points in a robot, thus facilitating the routing of a transmission line. Such a robot is disclosed in Japanese Patent Application No. 2006-135552 and "Robot Life, March 2007", pp. 136-139, issued by NESTAGE Co., Ltd., the contents of which are hereby incorporated by reference.

The RS485 communication scheme, which uses differential signals, is virtually immune to noise and to the effect of the resistance of a single cable, that is a transmission path, or the load resistance of a servo. This feature allows a large number of servos to be incorporated and moreover, advantageously facilitates the routing of cables. However, the RS485 scheme driver is expensive, thus increasing the cost of servos as a whole. In contrast, the TTL communication scheme is adversely affected by the resistance of the transmission path and by the load resistance of servos. The distal end of the transmission path is more susceptible to the influence of noise. Therefore, unlike the RS485 scheme, the TTL scheme has the problem that the length of a single transmission path must be short and that the number of connectable servos is small.

However, many types of servos of different torque and size have been conventionally used for hobby purposes other than in robots, for example, in model aircrafts. The TTL scheme allows those servos to be used in a variety of applications relatively easily. The TTL scheme can also keep down the cost of servos because of the reduced cost of the driver. Moreover, there is the advantage that a wide selection of products is available.

SUMMARY OF THE INVENTION

The present invention is made to overcome the above-mentioned problems. The problem of the present invention is to provide such a design that RS485 scheme servos and TTL scheme servos can be used in a mixed mode, even when the robot controller is designed to support the RS485 scheme.

According to the present invention, there is provided a robot which comprises a robot body having plural joints; servos mounted to the respective joints; a controller for controlling servos using differential signals; a transmission path connected between the controller and the servos, and having first and second signal lines, each acting as a differential signal line; a ground line and a power line for supplying a power source voltage; and a power source for supplying electric power to the controller and the servos. The servos are moved based on control signals from the controller to move the robot as desired. The robot further comprises a reference voltage generator circuit disposed on the transmission path for holding at least one of the differential signals, which are output from the controller and fluctuate between the potential of the power line and the potential of the ground line, at a constant potential, this being an intermediate potential between the two potentials.

The reference voltage generator circuit may be situated in the same cabinet as the controller or in the hub that divides a set of transmission lines into plural sets of transmission lines. Moreover, in an embodiment of the present invention, the reference voltage generator circuit includes a first resistor and a Zener diode, which are connected serially between the ground line and the power line, and a second resistor connected between a second signal line and the juncture of the first resistor and the Zener diode. The Zener diode holds a differential signal at a constant potential. In another embodiment, the reference voltage generator circuit may include a first resistor, a diode and a Zener diode, which are connected serially between the ground line and the power line, a second resistor connected between a second signal line and the juncture of the diode and the Zener diode, and a third diode connected between the first signal line and the juncture of the first resistor and the diode. The second signal line is held at a constant potential or at an intermediate potential between the potential of the power line and the potential of the ground line. The reference voltage generator circuit may be formed of a voltage divider circuit.

Furthermore, there is provided a hub used in a transmission line for a robot according to the present invention. The hub is applied to a robot including a robot body having plural joints, servos mounted on the respective joints, and a controller for controlling the servos using differential signals. The hub connects the controller and the servos and is used in a transmission path including first and second signal lines (each acting as a differential signal line), a ground line, and a power line for supplying a power source voltage. The hub divides control signals output from the controller into plural transmission paths. The hub comprises a reference voltage generator circuit, which has plural connectors connected in common to the first and second signal lines, the ground line, and the power line, respectively; a first resistor and a Zener diode, connected serially between the ground line and the power line; and a second resistor connected between the second signal line and the juncture of the first resistor and the Zener diode.

According to another aspect of the present invention, there is provided a reference voltage generator circuit used in a transmission line for a robot. The reference voltage generator circuit comprises a robot body having plural joints, servos disposed on the respective joints, a controller for controlling the servos using differential signals, a first resistor and a Zener diode, which are connected serially between the ground line and the power line, and a second resistor connected between a second signal line and the juncture of the first resistor and the Zener diode. The Zener diode maintains the differential signal at a constant potential or an intermediate potential between the potential of the power line and the potential of the ground line.

In the present invention described above, the reference voltage generator circuit is disposed on the transmission path between the robot controller and servos. Therefore, even if the controller is compatible with the RS485 scheme, the present invention can use, in a mixed mode, both RS485-compatible servos and servos that are compatible only with control signals formed of TTL scheme pulse signals. As a result, the types of adaptable servo can be increased markedly. Suitable servos can be used in accordance with the requirements of each joint.

Other objects and advantages of the invention will be apparent from the following description. In the description, reference is made to the accompanying drawings which form a part thereof, and in which there is shown by way of illustration a preferred embodiment of the invention.

Figure 1:
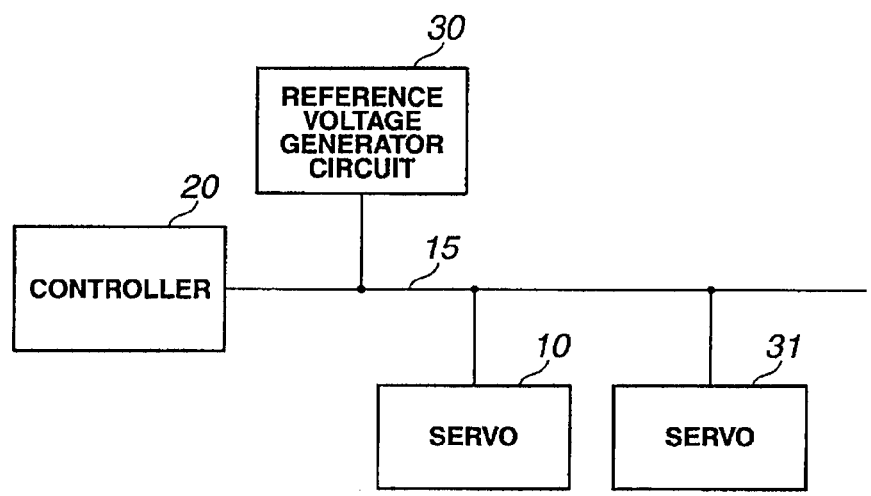
FIG. 1 is a graphical representation of an embodiment of a robot control system according to the present invention.

Before an exemplary embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

The present invention will be explained in detail by referring to the attached drawings. FIG. 1 shows a transmission path 15 between a controller 20 and first and second servos 10, 31 in a robot according to the present invention. A reference voltage generator circuit 30 is disposed on the transmission path 15 between the controller 20 and the servos 10, 31. Other structures in the controller 20 and the communication scheme between the controller 20 and a personal computer or radio are conventional as detailed above.

Figure 2:
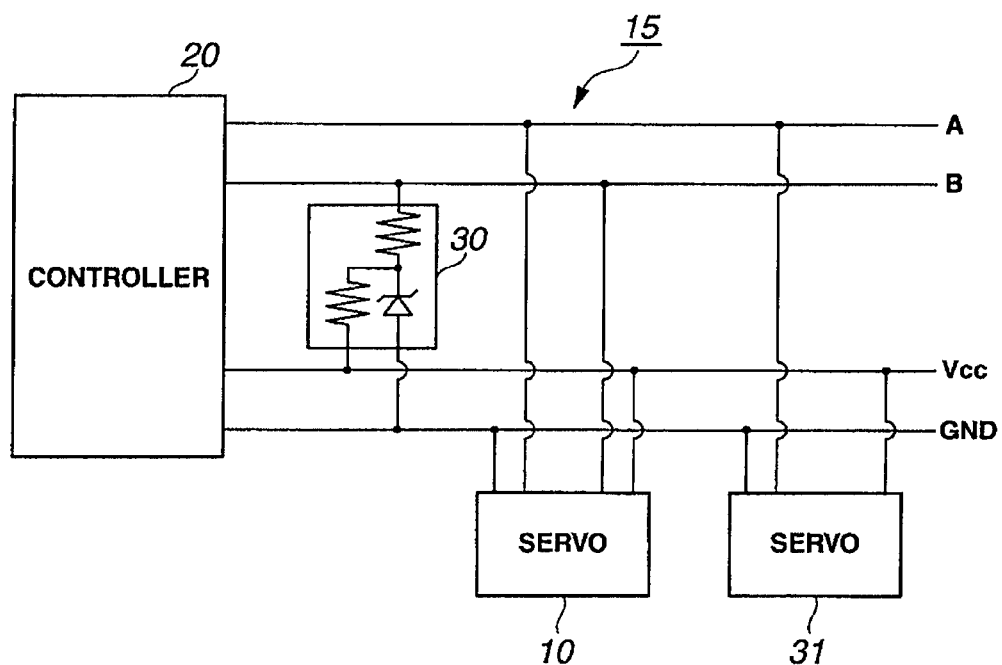
FIG. 2 is a schematic diagram illustrating the connecting relationship between a reference voltage generator, a controller and servos used in a robot according to the present invention.

FIG. 2 shows the connection relationship between the controller 20, the reference voltage generator circuit 30 and the servos 10, 31, with the respective parts close to an actual transmission path 15. The controller 20 is preferably a conventional RS485 scheme controller. The transmission path 15 between the controller 20 and the servos 10, 31 comprises four lines—two signal lines A, B, or first and second signal lines, respectively, each carrying a differential signal, the ground line GND, and a power line Vcc for supplying a power source voltage.

A terminal resistor (not shown) may be inserted, if required, at the end of the signal line to match the impedance of the transmission node with the impedance of the receiving node, so that reflection loss can be decreased. In the robot of the exemplary embodiment, the terminal resistor is not inserted because of the short transmission path and small reflection effect.

The first servo 10 operates in a conventional RS485 communication scheme. The second servo 31 operates in the TTL scheme. In the present example, both servos 10, 31 are used in a mixed manner. The second servo 31 is connected only to signal line A, acting as a first signal line. In the set of four transmission lines, the second servo 31 uses three signal lines including the ground line GND, the power line Vcc, and the signal line A.

Figure 3:
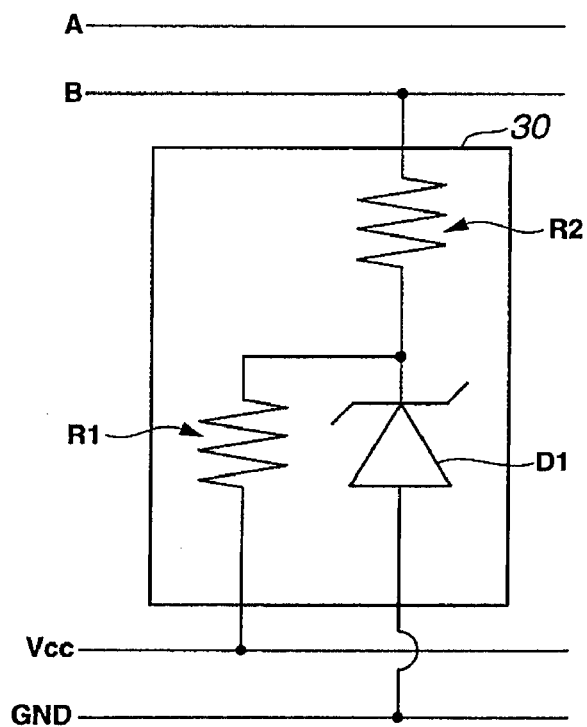
FIG. 3 is a schematic diagram illustrating a reference voltage generator used in a robot according to the present invention.

Referring now to FIG. 3, one embodiment of the reference voltage generator circuit 30 is shown. In the reference voltage generator circuit 30, a first resistor R1 and a Zener diode D1 are connected serially between the power line Vcc and the ground line GND. The anode of the Zener diode D1 is connected to the ground line GND. A second resistor R2 has one end connected to the signal line B, or a second signal line for transmitting an inversion signal, and the other end connected to the cathode of the Zener diode D1.

The Zener diode D1 biases the potential of the signal line B. When a control signal is not transmitted, the Zener diode D1 holds the potential of the signal line B at 2 volts. When the control signal is being transmitted, the potential of the signal line B varies according to the control signal.

The second resistor R2 has a value of several kilohms (e.g., 3.3 kΩ) to control the current flowing through the Zener diode D1. The first resistor R1 is used to reduce switching noise due to the Zener diode D1. The resistor R1 is designed so as to allow the flow of some current through the Zener diode D1, even at an L level. This feature allows the potential of the signal line B when the control signal is transmitted, to be held at a constant value, even without the first resistor R1.

Figure 4A:
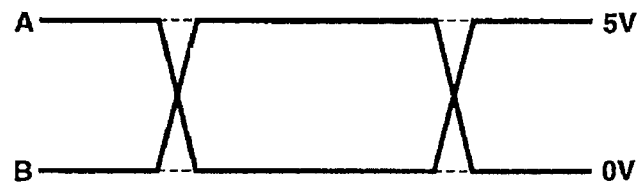
FIGS. 4(a)-(c) are graphical representations of signal statuses between a controller and a servo in a robot according to the present invention.
Figure 4B:
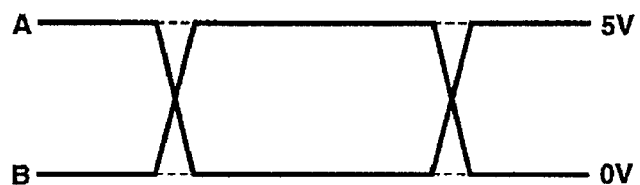
Figure 4C:
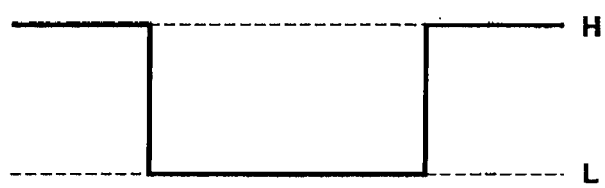

Referring also to FIGS. 4(a)-(c), explanation will be made as to the waveform of the signals between the controller 20 and the first servo 10. The function of the reference voltage generator circuit 30 will also be further explained. The controller 20 produces differential signals shown in FIG. 4(a). The first servo 10, connected to the two signal lines A and B, receives the differential signals. The first servo 10, which employs the RS485 communication scheme, can read out control signals H and L as logical values, as shown in FIG. 4(c).

Figure 5A:
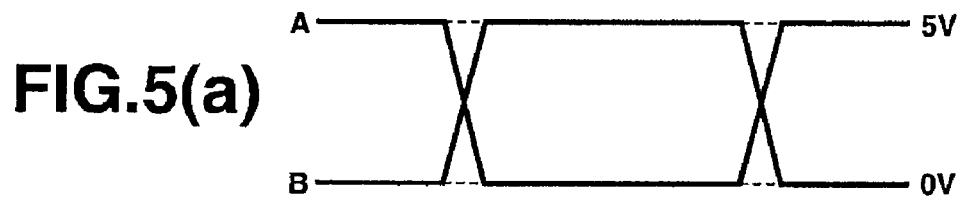
FIGS. 5(a)-(c) are graphical representations of signal statuses between a controller and a servo in a robot according to the present invention.
Figure 5B:
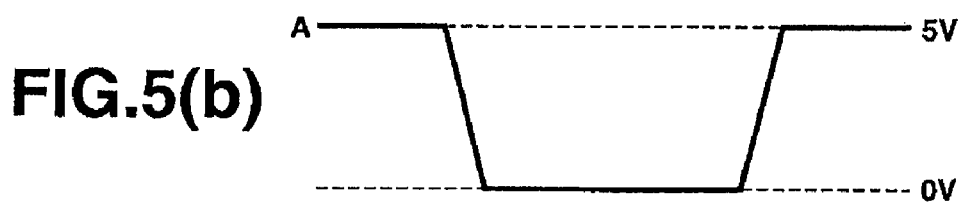
Figure 5C:
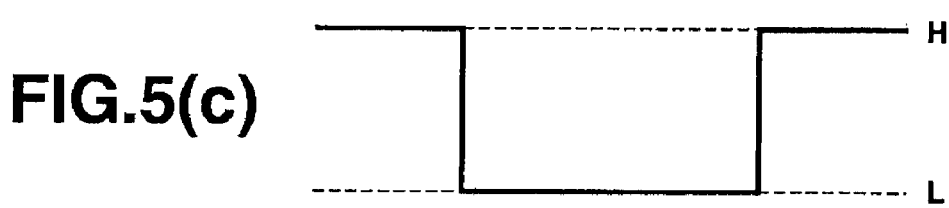

The second, i.e., TTL scheme, servo 31 is connected to the signal line A, but not to the signal line B. For that reason, when the controller 20 transmits a control signal to the second servo 31, the servo 31 reads only the signal on the signal line A, shown in FIG. 5(b), of the differential signal transmitted from the controller 20, as shown in FIG. 5(a). Thus, the H level corresponds to five volts while the L level corresponds to the ground level (about zero volts). The servo can easily recognize the control signal as a logical value of H or L, as shown in FIG. 5(c).

Figure 6A:
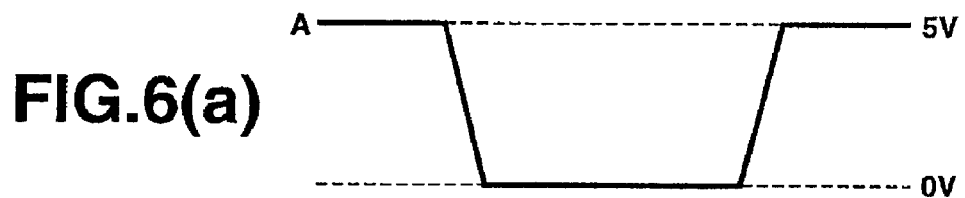
FIGS. 6(a)-(c) are graphical representations of signal statuses between a controller and a servo in a robot according to the present invention.
Figure 6B:
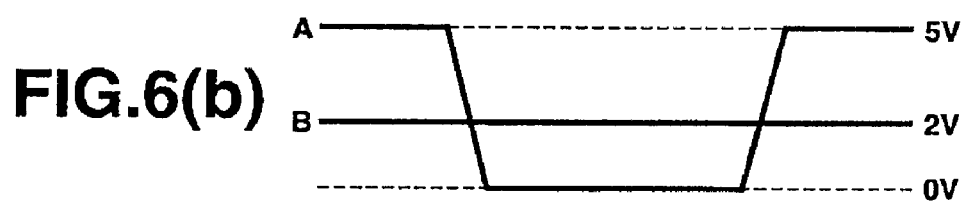
Figure 6C:
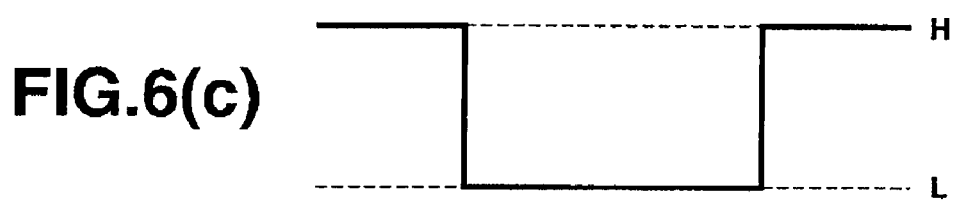

In contrast, when the second servo 31 transmits a control signal to the controller 20, the transmission driver of the second servo 31 outputs a control signal via the signal line A, as shown in FIG. 6(a), but does not output any signal onto the signal line B. The receiving driver of the controller 20, in the RS485 scheme, requires any definite control signal on the signal line B. However, even when the signal line B does not receive any control signal, the reference voltage generator circuit 30 biases the voltage by two volts, as shown in FIG. 6(b). Accordingly, the controller 20 can recognize the received signal from the servo 31 in the RS485 scheme as an H level signal of five volts or an L level signal of two volts. Thus, the controller 20 can recognize the received signal as having a logical value of H or L, as shown in FIG. 6(c). As a result, bi-directional communications can easily be performed between the controller 20 and the second servo 31.

In the reference voltage generator circuit 30 using the Zener diode D1, the power voltage depends on the type of secondary battery or the number of cells. Even when the potential of the power line Vcc is different, the bias potential can be held at a constant value. In the above embodiment, the reference voltage generator circuit 30 is disposed on the transmission path between the controller 20 and the servos. However, the same effect can be obtained even in the case where the reference voltage generator circuit is disposed between servos or on the termination of the transmission path.

When the transmission line becomes longer and a large number of servos are connected to a single transmission line, the effect due to the load resistance of the servo in the previous stage appears on the servo at the distal end. That effect causes the potential to boost the potential of the signal line B fixed by the reference voltage generator circuit. In contrast, the signal line A is affected by the voltage drop due to the resistance of the transmission line, so that the difference in potential between the H level and the L level is inevitably decreased. A servo may be disposed near the distal end of the transmission line and between the second, i.e., TTL scheme, servo 31 and the controller 20. In such a case, since the second servo 31 in the TTL scheme is particularly susceptible to the influence of noise, even when noise is induced onto the transmission path, differential signals are received with noise in phase occurring on the two signal lines A and B. As a result, the noise resistance characteristic can be improved.

Figure 7:
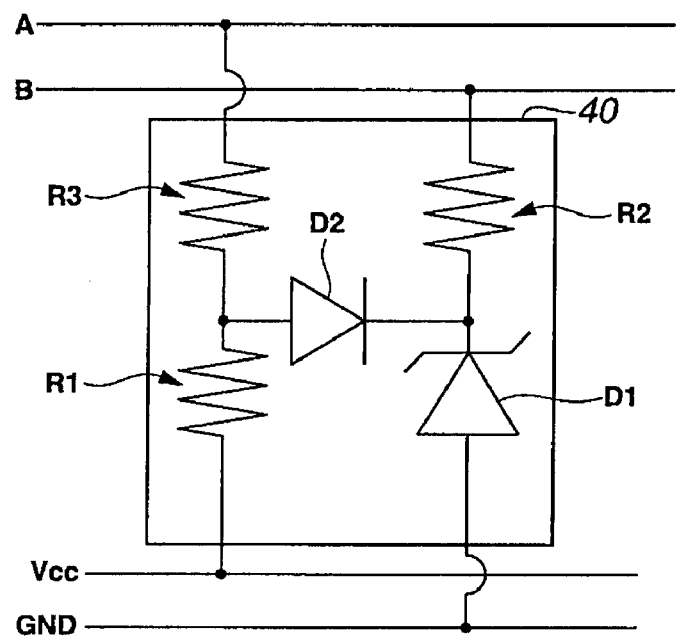
FIG. 7 is a schematic diagram illustrating one embodiment of a circuit for a reference voltage generator in a robot according to the present invention.

FIG. 7 shows another embodiment of the reference voltage generator circuit according to the present invention. The robot configuration, the controller, the transmission line, and the like are applied similarly to those described in the previous embodiment. In the reference voltage generator circuit 40 shown in FIG. 7, a diode D2 is disposed between the resistors R1 and R2 inserted between the power line Vcc and the signal line B, with the anode of the diode D2 connected to the resistor R1. A resistor R3 is connected between the signal line A and the anode of the diode D2.

In the present invention, the resistor R3 preferably functions as a load resistance of 2.2 kΩ, which is set at a lower value than that of the resistor R2. In such a configuration, when any signal is not transmitted to the transmission path, the signal line A can be set in such a way that the potential is always higher than the potential of the signal line B by the forward bias component of the diode D2 (for example, 0.6 volts). Accordingly, there is no case where such a received signal is determined as having an L logical value. This feature has the advantage that even if the process is resumed from the wrong decision about reception of the start bit signal, and an erroneous decision is made as a result, no unnecessary process is executed.

Figure 8:
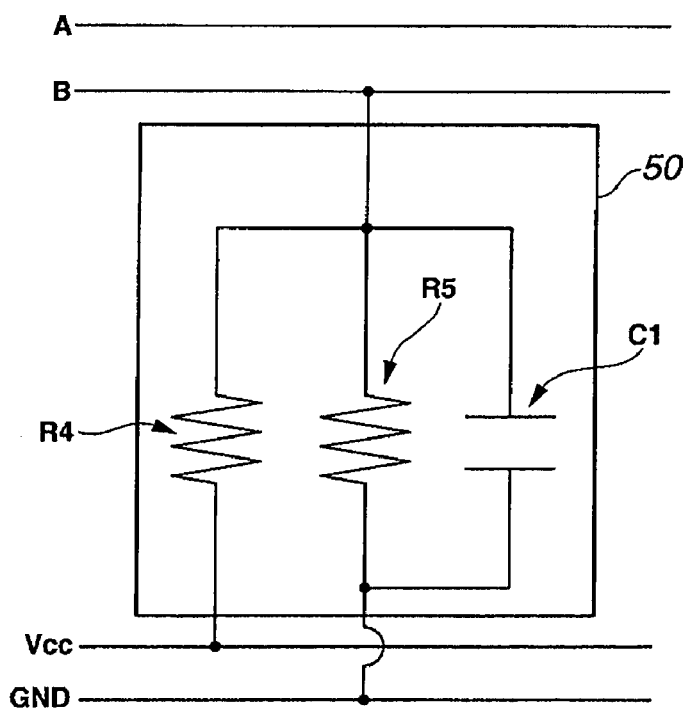
FIG. 8 is a schematic diagram illustrating another embodiment of a circuit for a reference voltage generator in a robot according to the present invention.

In the previous embodiment, the Zener diode D1 is used so as to handle variations in the power source voltage of seven to twelve volts. However, if the power source voltage is determined in advance, a voltage divider circuit 50, which comprises resistors R4 and R5 and a capacitor C1, can bias the potential of the signal line B, as shown in FIG. 8. The resistance values of the resistors R4, R5 are adjusted according to the potential applied to the power line Vcc and the bias potential to the signal line B.

In the previous embodiment, the reference voltage generator circuit may be disposed at a desired point along the transmission path. However, the reference voltage generator circuit may be incorporated in the cabinet, together with the controller. Alternatively, the reference voltage generator circuit may be incorporated in a hub, disposed on the transmission path, which branches a single signal line into plural signal lines.

Figure 9:
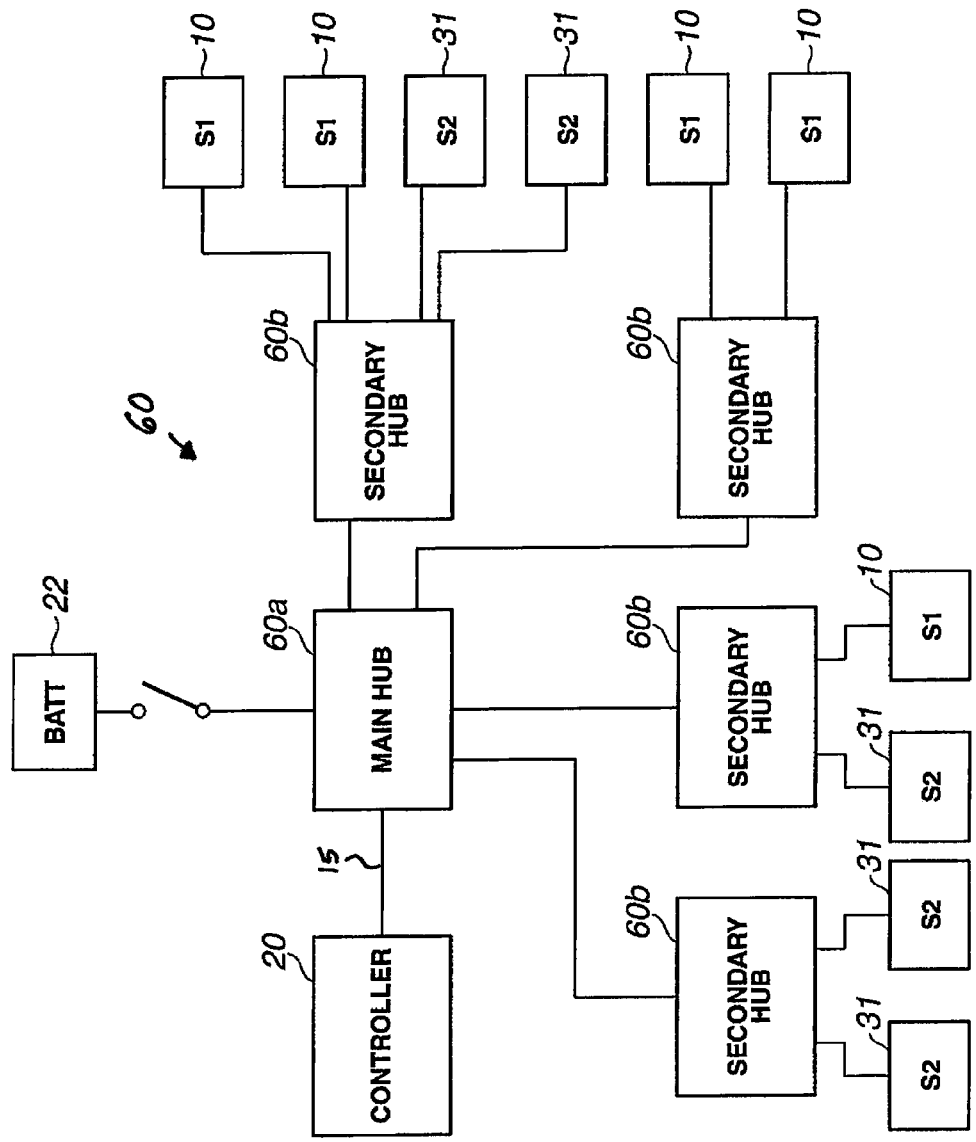
FIG. 9 is a graphical representation of another embodiment of a robot system including a hub having a main hub and secondary hubs according to the present invention.

As shown in FIG. 9, the hub is disposed on the transmission path 15 to which the controller 20 and the servos 10, 31 are connected. The transmission path 15 is divided inside the hub 60. A plurality of servos 10, 31 are connected to the hub 60. The reference voltage generator circuit is actually incorporated and disposed in the upper portion of the body or the waist of a robot. A single hub has a plurality of reference voltage generator circuits corresponding to respective limbs or body parts, for example, one leg including an ankle joint, a knee joint, and a hip joint, one arm including a shoulder, an elbow, and a wrist, and the like. The hubs 60 are disposed on a transmission path 15 with good routing, depending on the number of ports of the hubs and the number and position of the servos to be used.

The hub 60 comprises a main hub 60a, disposed near the power source 22, and secondary hubs 60b, disposed in other portions. The main hub 60a is disposed in the body of a robot and is connected to the power via a switch. The main hub 60a supplies a power source voltage to the controller 20 and the servos 10, 31 via the transmission path 15. The reference voltage generator circuit is disposed in the main hub 60a.

Figure 10:
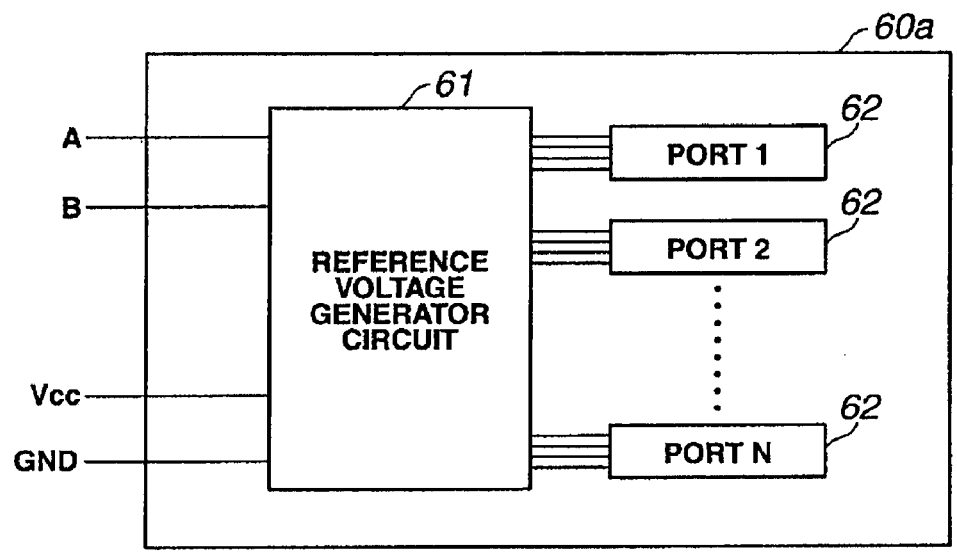
FIG. 10 is a schematic diagram illustrating an embodiment of the main hub of FIG. 9 according to the present invention.
Figure 11:
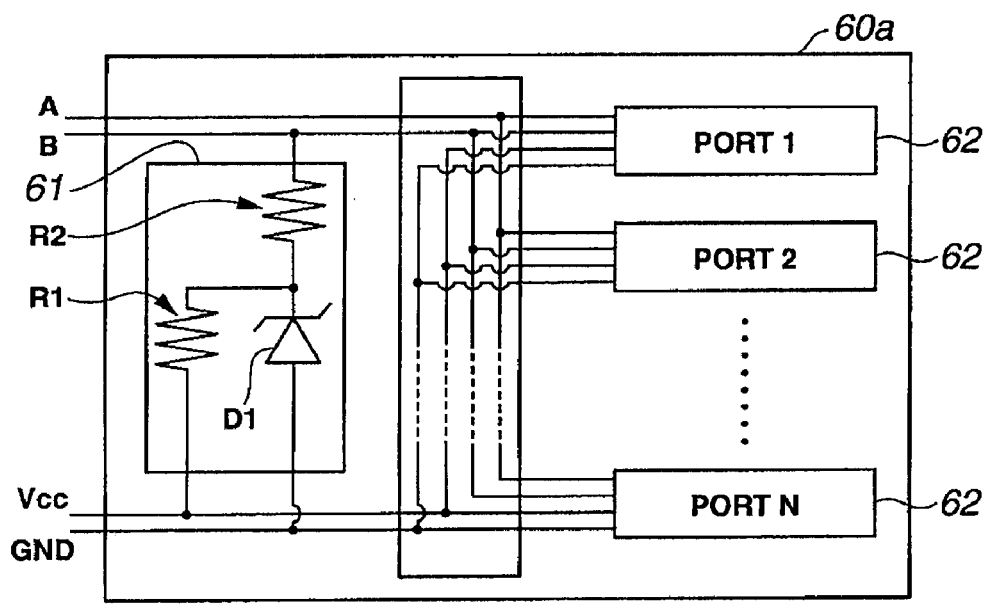
FIG. 11 is a schematic diagram illustrating an embodiment of a circuit of the main hub of FIG. 9 according to the present invention.
Figure 12:
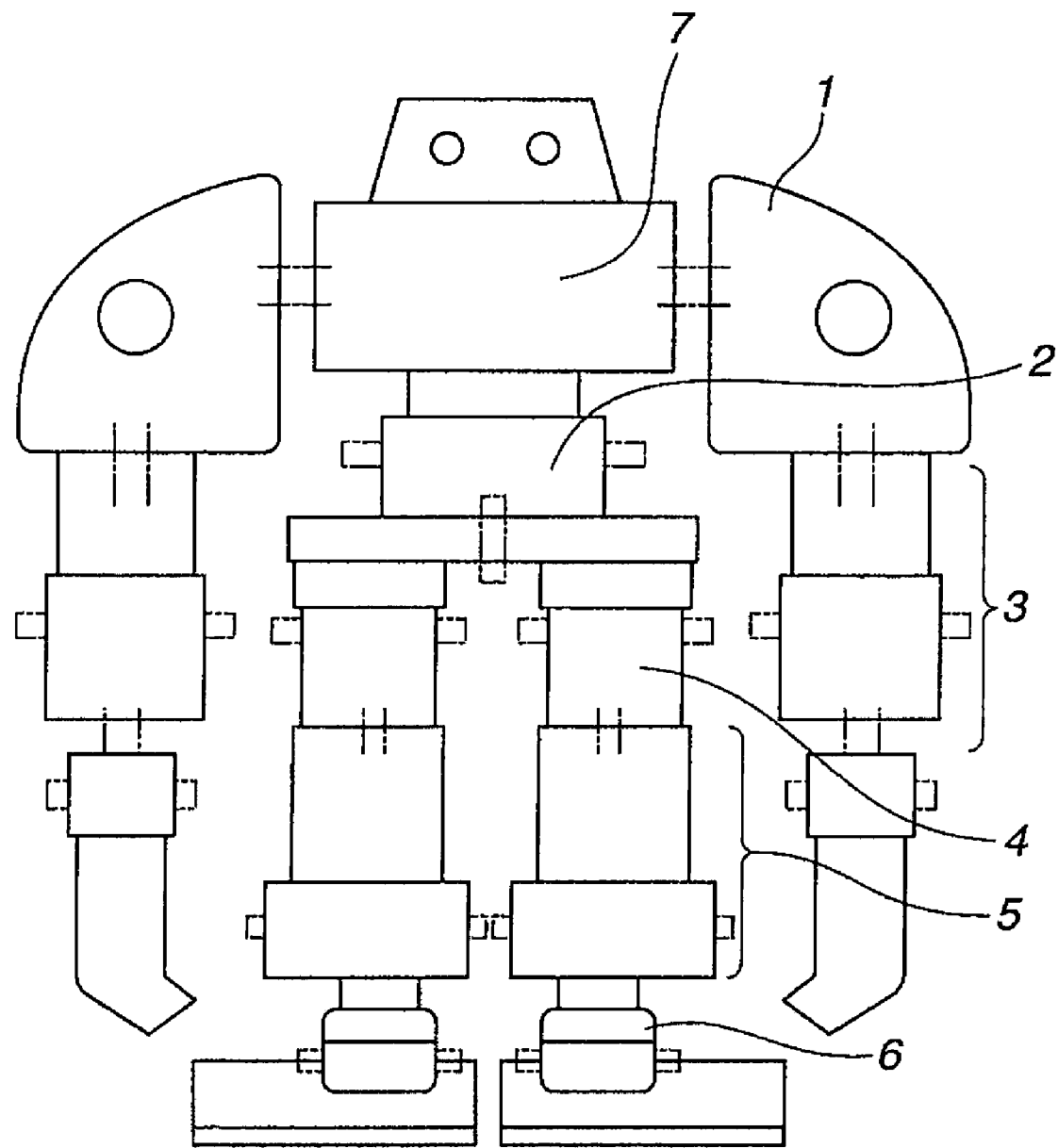
FIG. 12 is a front view of a robot constructed in accordance with one aspect of the present invention.
Figure 13A:
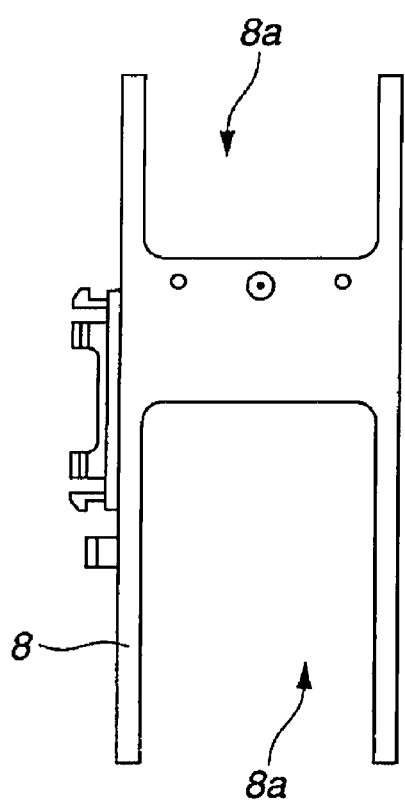
FIG. 13(a) is a front view of an exemplary frame part used in the robot of FIG. 12.
Figure 13B:
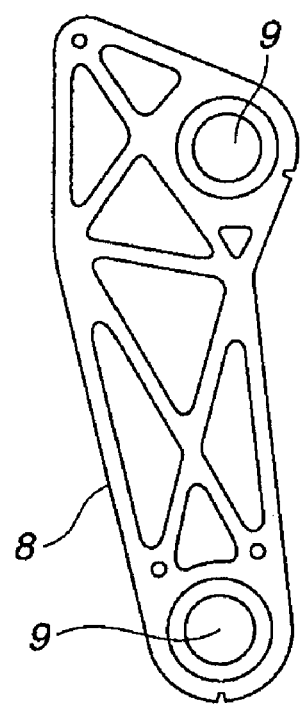
FIG. 13(b) is a side view of the frame part of FIG. 13(a)
Figure 14:
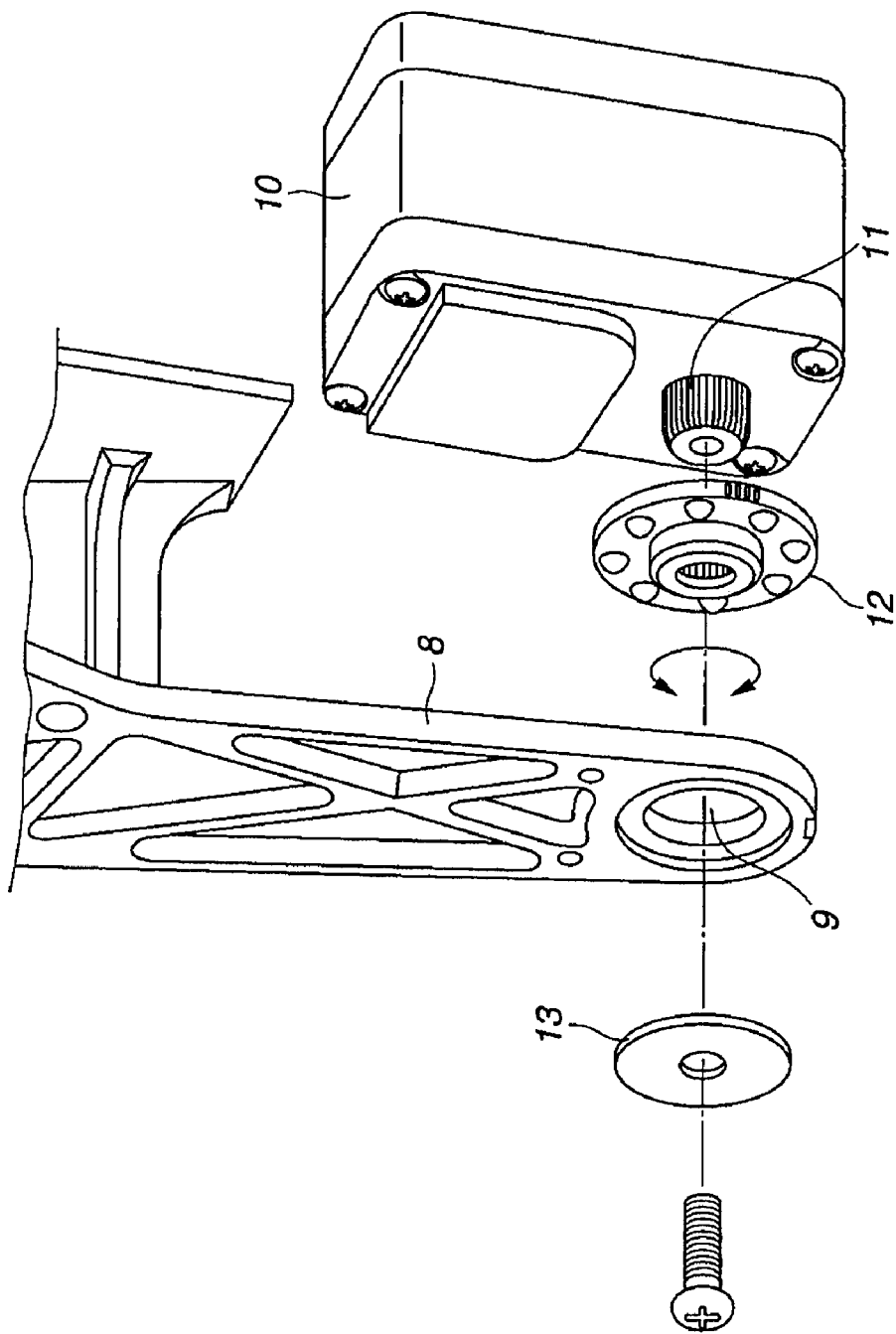
FIG. 14 is a fragmented partially exploded perspective view illustrating the attachment of a servo system to the frame part of FIG. 13(a)
Figure 15:
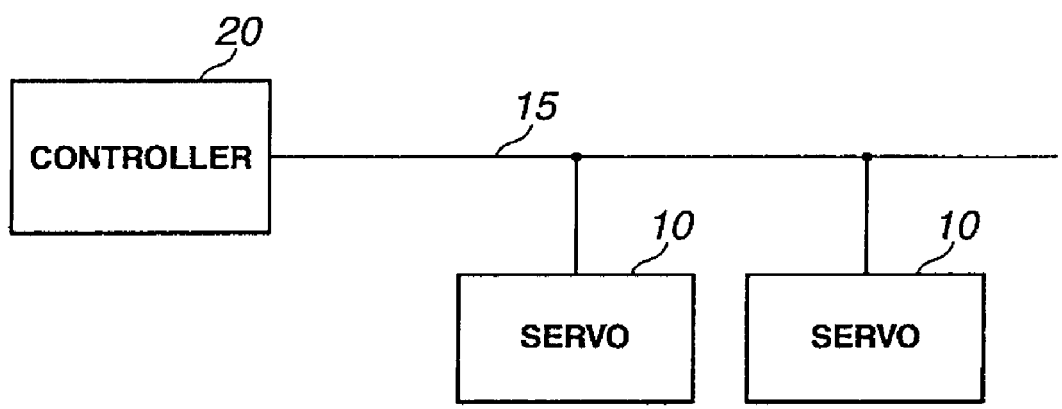
FIG. 15 is a graphical representation illustrating a connection between a conventional controller and servos.
Figure 16:
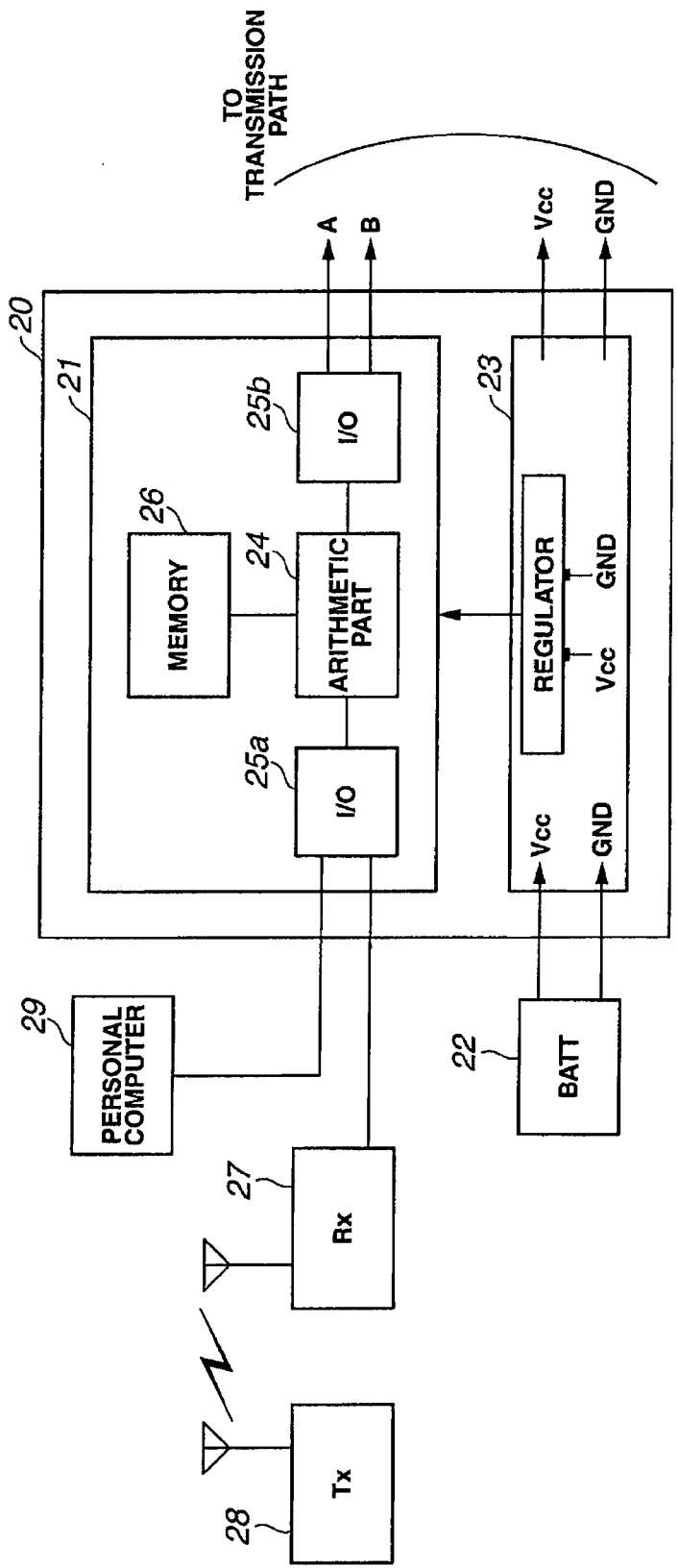
FIG. 16 is a graphical representation illustrating the entire configuration of a conventional controller.

The specific configuration of the main hub 60a will be explained with reference to FIGS. 10 and 11. FIG. 10 is a schematic diagram illustrating the main hub 60a. The main hub 60a comprises the reference voltage generator circuit 61 connected to a transmission path, including two signals lines A and B, the ground line GND, and the power line Vcc, and plural ports 62, each being formed by branching the transmission path. This is connected on the one hand to the controller 20 and other hubs 60a via the transmission path, and on the other to the servos 10, 31 via the port 62.

The circuit configuration will be explained more specifically with reference to FIG. 11. In the reference voltage generator circuit 61 shown in FIG. 11, the first resistor R1 and the Zener diode D1 are connected serially between the power line Vcc and the ground line GND. The anode of the Zener diodes D1 is connected to the ground line GND. The second resistor R2 has one end connected to the signal line B, which transmits an inversion signal, and the other end connected to the cathode of the Zener diode D1. In the present embodiment, the Zener diode D1 biases the potential of the signal line B. The Zener diode D1 holds the potential of the signal line B at 2 volts when the control signal is not transmitted. When the control signal is being transmitted, the potential of the signal line B varies according to the control signal.

The second resistor R2, which has a value of several kilohms (3.3 kΩ), controls the current flowing through the Zener diode D1. The first resistor R1 reduces the switching noise due to the Zener diode D1. Current is flowing slightly through the Zener diode D1 even at an L level. Deletion of the first resistor R1 does not influence the effect of holding the signal line B at a constant potential when the control signal is transmitted. As is apparent, the reference voltage generator circuit 61 is similar to the reference voltage generator circuit 30 shown in FIG. 3. Like the previous embodiment, the Zener diode D1 clips the potential of the signal line B to a constant value and the controller 20 uses a differential signal in the RS485 scheme. However, in mixed mode, the above-mentioned configuration can use both the servo 10, which uses a differential signal as a control signal, and the servo 31, which uses the TTL scheme.

As described above, by disposing the reference voltage generator circuit 61 in the main hub 60a, parts such as the substrate configuring the main hub 60a can be shared. Compared with arrangements where additional reference voltage generator circuits are disposed on the transmission path, the number of parts and installation spaces can be reduced advantageously. The reference voltage generator circuit 61 may be mounted on the secondary hub 60b, but the secondary hub 60b is somewhat large. Accordingly, arrangement of space must be considered in the layout design.

The reference voltage generator circuits 40 and 50, shown in FIGS. 7 and 8, have the same effect as that of the reference voltage generator circuit 61 in the hub 60. As described above, the reference voltage generator circuit is disposed independently on the transmission line, is housed in the same cabinet together with the controller 20, or is disposed in the hub on the transmission line. However, the reference voltage generator circuit can be effectively disposed at any point on the transmission between the first and second servos 10, 31 and the controller circuit.

The reference voltage generator circuit has been applied to a humanoid robot. However, the reference voltage generator circuit may be applied to quadruped animal-type robots, fish-type robots, dinosaur-type robots, monstrous beast-type robots, centipede-type robots, or snake-type robots. The reference voltage generator circuit can be particularly effective when applied to snake-like robots, which have long transmission paths and a large number of servos connected to a single transmission path.

In the forgoing embodiments, explanation has been made as to a negative logical circuit in which an H level is the normal status. However, the present invention is applicable to a configuration in which an L level is the normal status, and this is changed to an H level when a signal is input. In the explanation, the signal line B that transmits an inversion signal corresponds to a second signal line. However, the reference voltage generator circuits 30, 50 and 61, shown respectively in FIGS. 3, 8 and 11, can use the signal line A as the second signal line to read out the control signal as an H or L logical value. Moreover, when the signal line A is used as the second signal line, the reference voltage generator circuit 40, shown in FIG. 7, cannot be applied to a logical circuit with an H level as the normal status, but is suitable for a logical circuit with an L level as the normal status.

The present invention includes a controller using the RS485 scheme which outputs a differential signal as a control signal in serial communications. Accordingly, the present invention is applicable to robots including a servo, acting as an actuator, which uses a differential signal as a control signal, and a servo using a signal in the TTL scheme as a control signal.

The invention has been described in connection with what are presently considered to be the most practical and preferred embodiments. However, the present invention has been presented by way of illustration and is not intended to be limited to the disclosed embodiments. Accordingly, those skilled in the art will realize that the invention is intended to encompass all modifications and alternative arrangements included within the spirit and scope of the invention, as set forth by the appended claims.

What is claimed is:

1. A robot comprising,
   a robot body having a plurality of joints;
   a plurality of servos attached respectively to said plurality of joints;
   a controller for controlling said plurality of servos using differential signals;
   a transmission path connected between said controller and said plurality of servos, said transmission path including:
   a first and a second signal line each acting as a differential signal line,
   a ground line, and
   a power line to which a power source voltage is supplied;
   a power source for supplying electric power to said controller and said plurality of servos, wherein said plurality of servos are operated based on said differential signals providing serial communications from said controller to achieve a predetermined movement of said robot; and
   a reference voltage generator circuit disposed on said transmission path to hold one of the first single line and the second signal line outputting one of a pair of differential signals output from said controller, and varying between the potential of said power line and the potential of said ground line at a constant intermediate potential between said differential potentials,
   wherein the reference voltage generator circuit is connected with one of the first signal line and the second signal line, and is disconnected from the other of the first signal line and the second signal line,
   wherein the servos includes both a servo conforming to RS-485 and a servo conforming to TTL,
   wherein the servo conforming to RS-485 is in connection with the first signal line, the second signal line, the ground line, and the power line, and
   wherein the servo conforming to TTL is in connection with the other of the first signal line and second signal line, the ground line, and the power line.

2. The robot of claim 1, wherein said reference voltage generator circuit is disposed in the same package together with said controller.

3. The robot of claim 1, wherein said reference voltage generator circuit is formed in a hub splitting a set of transmission paths into a plurality of transmission paths.

4. The robot of claim 1, wherein said reference voltage generator circuit includes a first resistor and a Zener diode serially connected between said ground line and said power line, and a second resistor splitting from said first resistor and said Zener diode and connected between a second signal line, wherein said Zener diode holds the potential of a differential signal at a constant value.

5. The robot of claim 1, wherein said reference voltage generator circuit includes a first resistor, a diode, and a Zener diode, serially connected between said ground line and said power line, a second resistor connected between the juncture of said diode and said Zener diode and said second signal line, and a third resistor connected between the juncture of said first resistor and said diode and said first signal line, whereby said second signal line is held at an intermediate constant potential between the potential of said power line and the potential of the ground line.

6. The robot of claim 1, wherein said reference voltage generator circuit comprises a resistance voltage divider circuit.

7. A hub for use in a robot, said robot including a robot body having a plurality of joints, servos attached respectively to said joints, and a controller for controlling said servos using differential signals; said hub being used in a transmission path which connects said controller and said servos, said transmission path including a first and second signal line, each acting as a differential signal line, a ground line, and a power line to which a power supply voltage is applied; said hub splitting a control providing serial communication signal from said controller into plural transmission paths; said hub further incorporating a reference voltage generator circuit including plural connectors to each of which said first and second signal lines, said ground line, and said power line are connected in common, a first resistor and a Zener diode serially connected between said first resistor and said Zener diode, and a second resistor connected between said second signal line and the juncture of said first resistor and said Zener diode, wherein the reference voltage generator circuit is connected with one of the first signal line and the second signal line, and is disconnected from the other of the first signal line and the second signal line, wherein the servos includes both a servo conforming to RS-485 and a servo conforming to TTL, wherein the servo conforming to RS-485 is in connection with the first signal line, the second signal line, the ground line, and the power line, and wherein the servo conforming to TTL is in connection with the other of the first signal line and second signal line, the ground line, and the power line.

8. A reference voltage generator circuit applied to a robot, said robot including a robot body having a plurality of joints, servos attached respectively to said joints, a controller for controlling said servos using differential signals, and a transmission path connecting said controller and said servos, said transmission path including first and second signal lines, each acting as a differential signal line, a ground line, and a power line to which a power supply voltage is applied; said reference voltage generator circuit including a first resistor and a Zener diode, serially connected between said ground line and said power line, and a second resistor connected between said second signal line and the juncture of said first resistor and said Zener diode, whereby said Zener diode holds a differential signal at a constant potential, which is an intermediate potential between the potential of said power line and the potential of said ground line, wherein the reference voltage generator circuit is connected with one of the first signal line and the second signal line, and is disconnected from the other of the first signal line and the second signal line, wherein the servos includes both a servo conforming to RS-485 and a servo conforming to TTL, wherein the servo conforming to RS-485 is in connection with the first signal line, the second signal line, the ground line, and the power line, and wherein the servo conforming to TTL is in connection with the other of the first signal line and second signal line, the ground line, and the power line.

\* \* \* \* \*